United States Patent [19]

Arbus

[11] Patent Number: 5,339,707
[45] Date of Patent: Aug. 23, 1994

[54] COMPOUND AUTOMOTIVE TRANSMISSION FOR LIGHT TRUCKS

[76] Inventor: William J. Arbus, 386 N. 560 West, American Fork, Utah 84003

[21] Appl. No.: 999,746

[22] Filed: Dec. 31, 1992

[51] Int. Cl.⁵ ............................................. F16H 57/02
[52] U.S. Cl. ................... 74/606 R; 74/745; 74/413
[58] Field of Search ............ 74/606 R, 745, 359, 74/373, 410, 425, 413

[56] References Cited

U.S. PATENT DOCUMENTS

| | | | |
|---|---|---|---|
| 3,046,807 | 7/1962 | Barth et al. | 74/331 |
| 3,793,900 | 2/1974 | Benson | 74/413 |
| 3,864,990 | 2/1975 | Lacoste | 74/745 X |
| 4,137,794 | 2/1979 | Horstmann et al. | 74/606 R |
| 4,152,949 | 5/1979 | Vandervoort et al. | 74/331 |
| 4,434,606 | 3/1984 | Rhodes et al. | 74/410 X |
| 4,641,547 | 2/1987 | Stich et al. | 74/606 R |
| 4,744,436 | 5/1988 | Uchiyama | 74/606 R X |
| 4,922,599 | 5/1990 | Durfee | 74/606 R X |
| 4,951,527 | 8/1990 | Klazura | 74/745 X |

OTHER PUBLICATIONS

Pertinent excerpts from a publication incorporated in the application by reference, namely the cover page and pp. 28–33 of New Process Gear Catalog No. 25 of Jan. 1988.

Primary Examiner—Vinh T. Luong
Attorney, Agent, or Firm—Mallinckrodt & Mallinckrodt

[57] ABSTRACT

A compound transmission comprises two simple type transmissions, each having a mainshaft to provide a main transmission section and an auxiliary transmission section interconnected end-to-end by an interposed, dividing wall, which may be in the form of an adaptor plate. A power input drive leads into the free end of the main transmission section, while a power output tailshaft leads from the free end of the auxiliary transmission section. The mainshaft of the main transmission section extends through the dividing wall, is journaled therein, and terminates within the auxiliary transmission section as an auxiliary power input drive therefor. The auxiliary transmission section is provided with speed change gears that may be selectively employed with selected ones of normal speed change gears provided by the main transmission section to multiply the number of normal speed change gears available in the compound transmission, the power input speed ratio between the main transmission section and the auxiliary transmission section being such that the speed change gears added by the auxiliary transmission section are able to utilize the peak power range of any engine with which the compound transmission is used.

9 Claims, 3 Drawing Sheets

COMPOUND AUTOMOTIVE TRANSMISSION FOR LIGHT TRUCKS

BACKGROUND OF THE INVENTION

1. Field

The invention is in the field of automotive transmissions and particularly of so-called "compound" transmissions which utilize a main transmission and an auxiliary transmission in combination.

2. State of the Art

Compound transmissions for increasing the range of available speeds are old in the art, but, as heretofore constructed, have been for use in heavy duty trucks. These have motors of low RPM requiring almost stopping of the vehicle to change gears if usual "jamming" is not successfully accomplished. To adapt this type of transmission for use in what are generally recognized as light duty trucks, namely, pick-up trucks or other trucks of up to two ton class, planetary gearing has been used to conserve space so the compound transmission will fit into the usual envelope space provided by the truck. This, however, results in undesirable sacrifice of structural strength for the transmission.

Some attempts have been made to obtain a greater range of available speeds without compounding transmissions, as in U.S. Pat. No. 3,046,807 issued to E. J. Barth and Carl J. Gustaffson on Jul. 31, 1962 for a "Double Countershaft Multispeed Transmission". However, the transmission of that patent is for use in heavy duty vehicles.

In U.S. Pat. No. 4,152,949 of May 8, 1979 issued to John R. Vandervoot and Alan R. Davis on May 8, 1979 for an "Extended Range Transmission", the transmission is of so-called "simple" type having a one-piece main shaft. It is not a compound transmission combining main and auxiliary transmissions, and, again, it is for use in heavy duty vehicles.

SUMMARY OF THE INVENTION

A primary objective in the making of the present invention was to provide several times the usual number of speed changes in a compound transmission made up of combined "simple" type transmission sections for use in light trucks and other light, rather than heavy duty, equipment, while maintaining structural strength by use of non-planetary gearing and to do so substantially without adding to space requirements and while maintaining gear synchronization in shifting from speed to speed so as to avoid the "jamming" in shifting of gears as is presently the case with heavy duty trucks that use commercially available transmissions.

In accomplishing the foregoing objective, I have combined in end-to-end alignment two "simple" type transmissions customarily used in light trucks, but specially modified and with interposed wall means, shown here in the form of an adapter plate, so as to form a unique compound transmission having a conventional power input drive (which is adapted to the particular vehicle in which used), a modified mainshaft for the main transmission section, and a modified mainshaft for the auxiliary transmission section (with integral tail shaft portion adapted to the particular vehicle with which used).

A typical, "simple" type, four speed, manual transmission customarily employed in various automotive vehicles, such as Chrysler Corporation's "Dodge" pick-up trucks, is produced by Chrysler's New Process Gear Division as Model 435. This standard transmission is used herein to exemplify how the invention makes use of a basic "simple" type transmission design.

THE DRAWINGS

The best mode presently contemplated for carrying out the invention in actual practice is illustrated in the accompanying drawings, in which:

FIG. 1 is a perspective view taken longitudinally of the compound transmission of the invention, the power input drive being in the forefront;

FIG. 2, a longitudinal vertical section takes on the line 2—2 of FIG. 1, partially in elevation and with portions broken out for convenience of illustration;

FIG. 3, transverse vertical section taken through the transmission on the line 3—3 as indicated in FIG. 2, showing the adapter plate in front elevation;

FIG. 4, a perspective view of the prior art mainshaft part of a Model 435 "simple" type transmission; and FIG. 5, a view similar to that of FIG. 4 but showing how the prior art mainshaft shown in FIG. 4 is modified for use in the forward or main transmission section of the compound transmission of the invention shown in FIGS. 1 and 2.

DETAILED DESCRIPTION OF THE ILLUSTRATED EMBODIMENT

Figure 1:
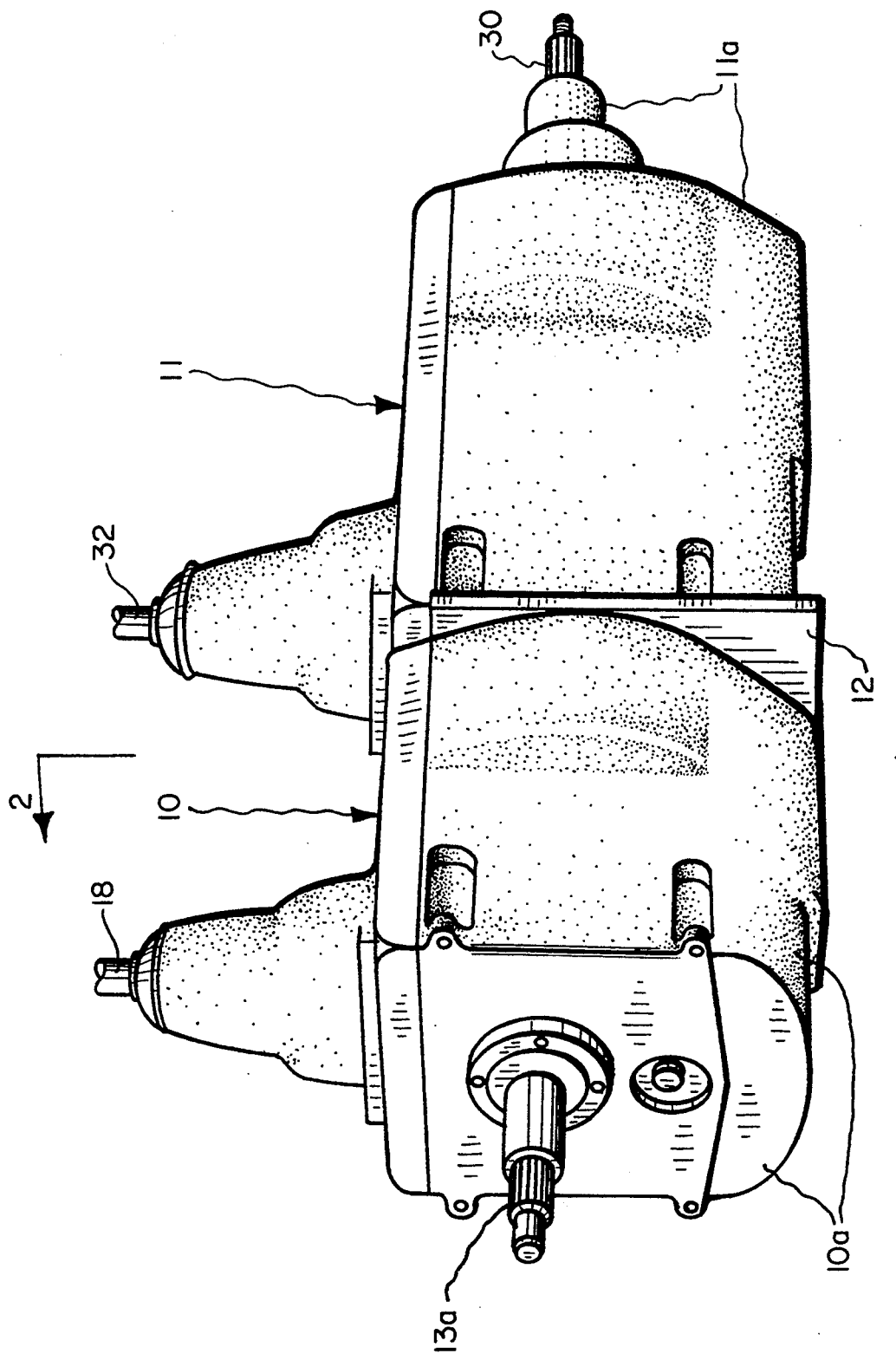
Figure 2:
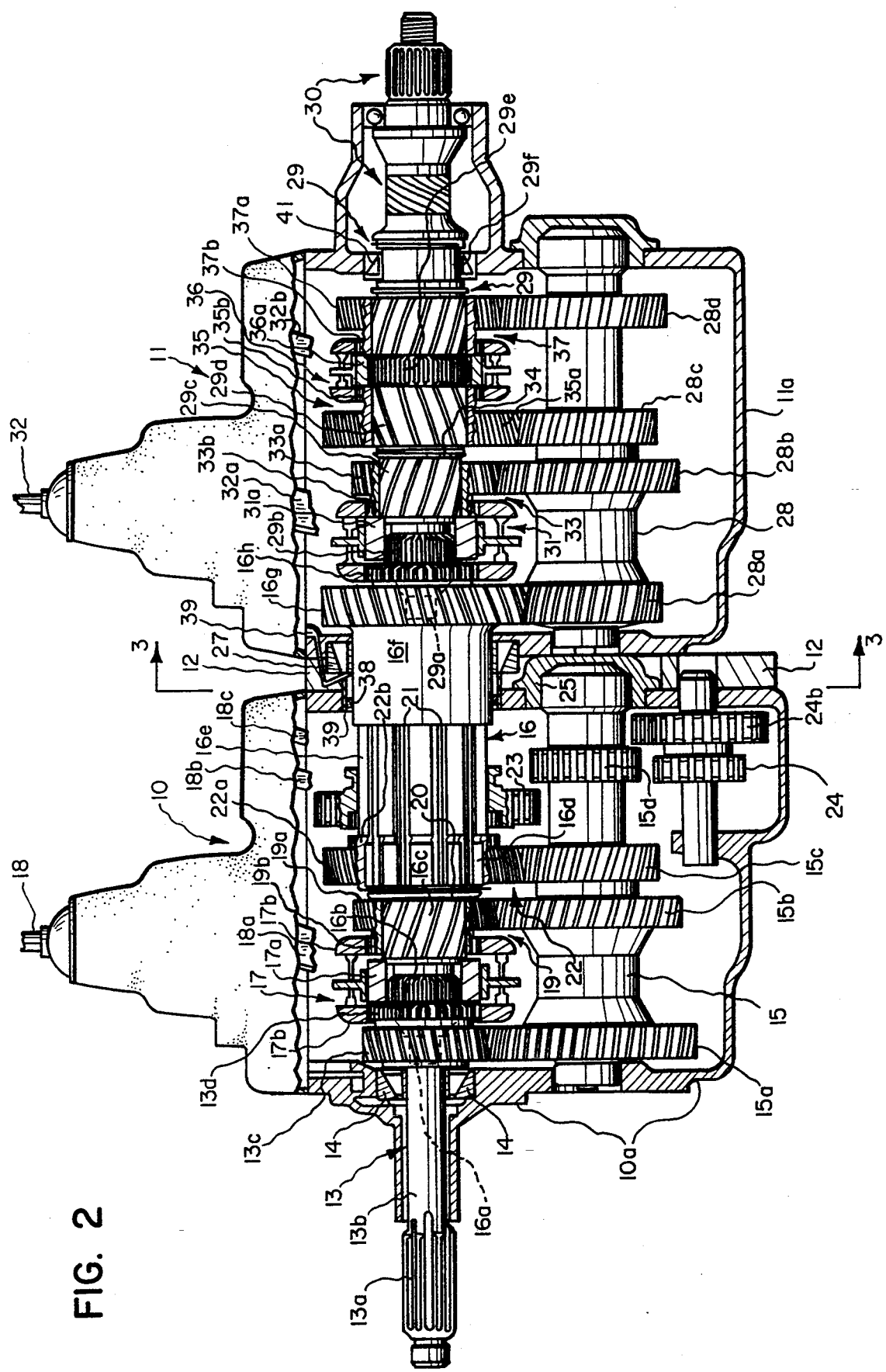
Figure 3:
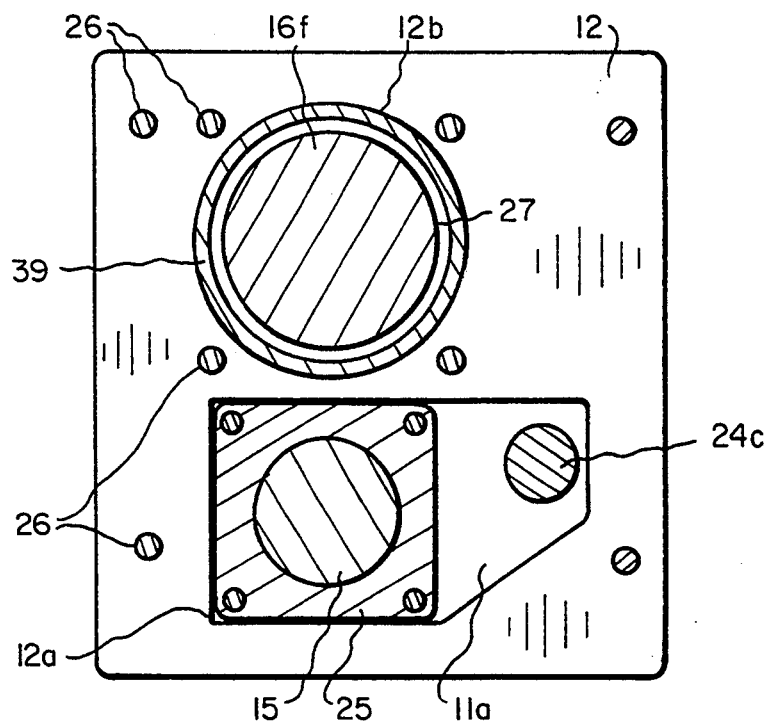

In the illustrated embodiment of the compound transmission of the invention, two transmission sections 10 and 11 FIGS. 1 through 3, are combined end-to-end with an interposed adapter plate 12 therebetween. Transmission section 10 constitutes, in effect, a main transmission, and transmission section 11 constituting, in effect an auxiliary transmission. The compound transmission illustrated has four times the number of speed ratios or driving gears, i.e. sixteen, as does a single Model 435 transmission and is capable of fitting into the space available in a light truck, e.g. a standard pick-up truck or a truck of up to two ton class, while maintaining structural strength despite the fact that planetary type gearing is not employed. Such compound transmission of the invention may have only three times the usual number of speed ratios or driving gears, i.e. twelve, by omitting the underdrive gearing in the auxiliary transmission section 11 shown in FIG. 2.

As previously indicated, the two transmission sections 10 and 11 shown here are adapted from the commercial, four speed, "simple" type transmission produced by New Process Gear Division of Chrysler Corporation as its Model 435 Manual Transmission, which is illustrated and described in detail in its publicly available Catalog No. 25 of January 1988, incorporated herein by reference. Such Model 435 transmission may be purchased on the open market as commercially produced and then two of them modified and combined by the purchaser as was done by this applicant in producing a prototype of the invention, but the compound transmission of the invention will desirably be commercially produced, as such, by modern machining and machine shop practice as a final product. However, modified parts may be produced commercially and sold in kit form to those purchasers who may have access to and a desire to use new or previously used Model 435 transmissions, or their equivalent, in making their own compound transmission of the invention.

A letter designation sometimes used with the number 435 has to do only with the number of gear teeth used on certain of the gears; primarily the power input gears.

Figure 4:
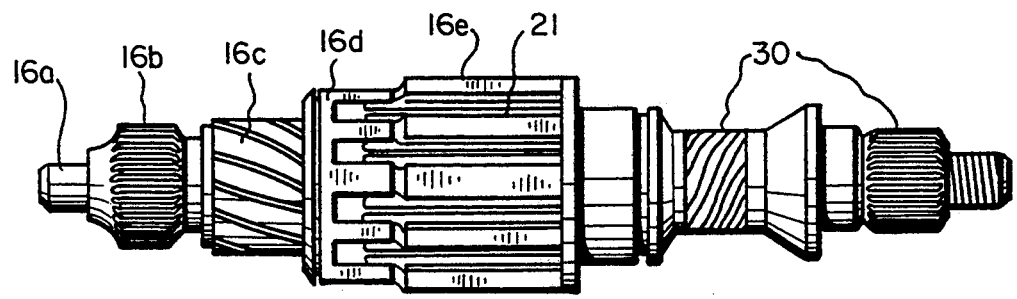
Figure 5:
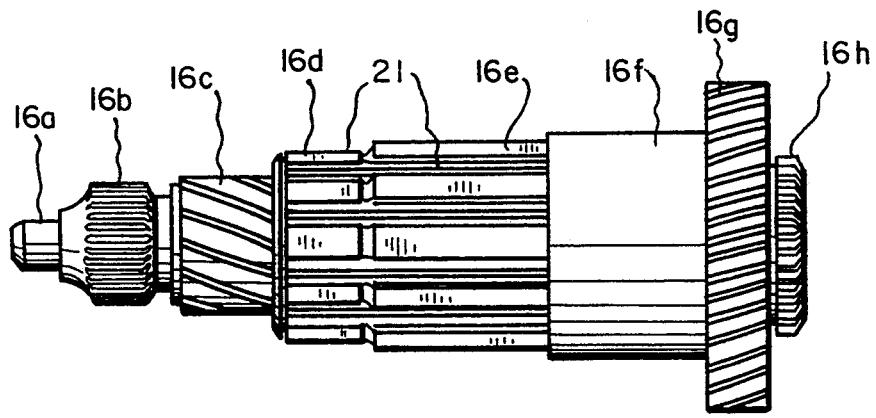

As shown in FIG. 2, the compound transmission of the invention retains the usual power input drive 13 for the forward or main transmission section 10, but utilizes, as the mainshaft of such transmission section 10, the modified and specially fabricated mainshaft 16 shown per se in FIG. 5 as compared with the usual unmodified mainshaft of the prior art shown in FIG. 4 with identical parts identically marked.

Such usual power input drive 13 comprises the usual splined exterior end 13a (adapted for the particular vehicle concerned) of shaft 13b which extends into housing 10a of transmission section 10 through a tapered roller bearing 14 that is fitted into a receiving portion of such housing 10a. Shaft 13b has fixedly mounted thereon, at its rearward end within housing 10a, for rotation with such shaft, the usual main drive gear 13c and the usual additional spur drive gear 13d, which provides the usual direct or fourth speed ratio drive for the transmission.

Drive gear 13c is helical and in constant mesh with the usual helical countershaft gear 15a on the usual countershaft 15, which also includes the usual series of helical countershaft gears 15b and 15c and spur gear 15d fixedly secured thereon. Such countershaft 15 is journaled, as usual, in respective bearings shown only schematically.

Shown per se in FIG. 4 is the mainshaft of a Model 435 Manual Transmission, including the usual tailshaft portion (30) thereof, representing prior art. Shown in FIG. 5 is such prior art mainshaft of FIG. 4 as it is modified by elimination of the tailshaft portion and by being specially fabricated pursuant to the invention to provide the mainshaft 16 of the forward or main transmission section 10 and the power input drive for the rearward or auxiliary transmission section 11 of the compound transmission of FIGS. 1 and 2.

The modified and specially fabricated mainshaft 16 of the forward or main transmission section 10 of the compound transmission of the invention, FIG. 2, retains the usual forward portion of the prior art mainshaft, FIG. 4. This includes the usual forward shaft end 16a, which fits into and is supported by an antifriction bearing (not shown) that is, itself, fitted into the adjacent recessed rearward end of power input shaft 13b on which are the drive gears 13c and 13d. Such shaft end 16a is followed, as usual, by the usual cylindrical mounting member 16b, which provides splines that receive the usual clutch gear 17a of the usual sliding synchromesh clutch mechanism 17 to provide, as usual, for direct drive ratio (fourth gear) when such clutch mechanism 17 (that, as usual, is slidably mounted on clutch gear 17a) is slid, by operation of the usual gearshift stick 18 acting through lever 18a, into mesh with drive gear 13d while still being partly in mesh with clutch gear 17a. Direct drive does not go through countershaft gears.

When synchromesh clutch mechanism 17 is centered over clutch gear 17a, by action of gearshift stick 18 and shift lever 18a, transmission section 10 is in neutral.

As is well known in the art, clutch gear 17a, which is splined onto cylindrical mounting member 16b, is meshed externally by sliding clutch mechanism 17 when speed of gear rotation is slowed by the usual synchromesh caps 17b, respectively.

Cylindrical mounting member 16b is followed on mainshaft 16 of transmission section 10 by the usual longitudinal shaft portion 16c provided with usual oil grooves, as shown. Rotatably mounted on shaft portion 16c is a dual gear 19 having a helical gear portion 19a in constant mesh with countershaft gear 15b to provide a 3rd drive ratio, i.e. third gear, for the transmission when slidable clutch mechanism 17 is moved from neutral position to engage spur gear portion 19b of dual gear 19.

Following the usual snap ring groove on mainshaft 16 of main transmission section 10, which receives the usual snap ring 20, are the usual longitudinal, dual diameter main shaft portions 16d and 16e, provided with spline grooves 21 which are usual except for being extended to the forward end of such main shaft portion 16d for enabling installation of a gear not otherwise installable as will become clear below. Rotatably mounted on the forward one, 16d, of such dual diameter mainshaft portions is a usual dual gear 22, having a forward, helical gear portion 22a in constant mesh with countershaft helical gear 15c to provide a 2nd drive ratio, i.e. second gear, for the transmission when the usual triple purpose, sliding spur gear 23 (that is splined onto the rearward main shaft portion 16e) is slid forwardly, by operation of gearshift stick 18 activating the usual shift lever 18b, into mesh with the rearward spur gear portion 22b of dual gear 22. As is well known in the art, spur gear 23 is splined to rotate with mainshaft 16 and to be shifted so that its internal spur gear portion 23a is brought into mesh with spur gear 22b. It has a clutch part (not shown) that provides synchronization for the 2nd drive ratio, i.e. second gear. When gearshift stick 18 is in neutral position, gear 23 is not in mesh with either gear portion 22b or countershaft gear 15d.

For 1st drive ratio, i.e. first gear, gearshift stick 18 is operated to slide gear 23 rearwardly on mainshaft portion 16e into mesh with countershaft gear 15d.

Reverse drive is provided for in the usual manner utilizing the usual reverse dual gear assembly 24 made up of fixedly interconnected reverse gears 24a and 24b slidedly mounted on shaft 24c. When gearshift stick 18 is thrown into reverse, shift lever 18c shifts sliding gears 24a and 24b into mesh with gears 23 and 15d, respectively, it being realized that the showing in FIG. 2 is somewhat illusory so far as the true position of reverse gear assembly 24 sidewise below, see FIG. 3, rather than directly below is concerned.

The usual mainshaft of FIG. 4 is modified, as shown in FIGS. 2 and 5, by increasing its diameter along the longitudinal portion 16f thereof, rearwardly of the usual longitudinal portion 16e thereof which is provided with spline grooves 21 and receives the usual gear 23. The spline grooves 21 are extended forwardly through shaft portion 16d so gear 23 can be installed forwardly on shaft portion 16e in view of the enlarging of the diameter of shaft portion 16f.

As previously indicated, countershaft 15 of transmission section 10 is supported by usual anti-friction bearings (shown only schematically), the rear one of which is accommodated by a housing 25 that extends through a receiving opening 12a, FIG. 3, in adapter plate 12. Such adapter plate is fastened to and between housing 10a and 11a of transmission section 10 and 11, respectively, by strategically placed fasteners 26. It serves as a wall separating the two transmission sections and through which the mainshaft 16 extends and within which it is journaled.

To support the modified mainshaft 16 of the compound transmission of the invention, at its enlarged portion 16f, the usual ball bearing at the rearward end of such mainshaft 16 of the forward or main transmission section 10 is replaced by a larger tapered roller bearing 27, which counters thrust and takes care of radial load.

Shaft portion 16f, whose diameter is increased, extends through a bearing-accommodating opening 12b, FIG. 3, in adapter plate 12 and into housing 11a of auxiliary transmission section 11. It has formed, rigidly thereon, at its free end within housing 11b, an auxiliary, power drive, helical gear 16g, which is in constant mesh with helical countershaft gear 28a of auxiliary countershaft 28.

Auxiliary power drive gear 16g of the mainshaft 16 of main transmission section 10 and countershaft gear 28a of countershaft 28 of auxiliary transmission section 11 are modified from the usual by changing the power input gear ratio for such auxiliary transmission section 11, which change is carried out in this instance by changing the number of gear teeth on auxiliary power drive gear 16g from the usual seventeen (on power input gear 13c) to twenty-six, and by changing the number of gear teeth on countershaft gear 28a from the usual forty-three (on countershaft gear 15a) to thirty-four.

Change in this auxiliary power drive gear ratio is necessary for the purpose of enabling the compound transmission of the invention to utilize the narrow peak performance power band of any given vehicle power plant, or of any given power plant of other equipment, for the additional speed ratios contemplated by the invention.

The normal power band of an automotive engine used in "light" trucks with which this invention is concerned is from about 1000 RPM to about 3500 RPM. The narrow peak performance part of this normal power band is from about 2500 RPM to about 3000 RPM, namely about twenty percent of the total power band width but comprehending about fifty percent of the total foot pounds of torque which the engine can develop. Thus, if the circumstances, such as climbing up a grade, require greater torque delivery by the transmission than can be delivered by a particular driving gear, it becomes necessary to shift down in speed ratio. With the transmission of the invention, this can be accomplished within the narrow band of peak performance, whereas, without effective speed ratios for this purpose being available within the narrow range of peak performance as they are in accordance with the invention, effective relatively high engine torque that is otherwise available for the purpose is incapable of being used and a lower engine torque must be used with greater use of fuel and consequent greater expense.

In the following table are listed the most prominent commercial transmissions on the market in the particular vehicle class with which the present invention is concerned, together with percentage speed ratio change between progressive speed change gears, in comparison with the same information for the novel compound transmission of the invention:

| SP | TRANS-MISSION | 1ST DL | 1ST UD | 1ST D | 1ST OD | 2ND UD | 2ND D | 2ND OD | 3RD UD | 3RD D | 3RD OD | 4TH UD | 4TH D | 4TH OD |
|---|---|---|---|---|---|---|---|---|---|---|---|---|---|---|
| 4 | New Proc. 445 | | | 4.56 | (50%) | | 2.28 | (42%) | | 1.31 | (24%) | | 1.00 | |
| 4 | New Proc. 435A | | | 4.56 | (50%) | | 2.28 | (42%) | | 1.31 | (24%) | | 1.00 | |
| 4 | New Proc. 435L | | | 6.68 | (50%) | | 3.34 | (50%) | | 1.66 | (40%) | | 1.00 | |
| 4 | Muncie SM465 | | | 6.55 | (45%) | | 3.58 | (51%) | | 1.70 | (41%) | | 1.00 | |
| 4 | Warner T18B | | | 4.32 | (48%) | | 2.26 | (33%) | | 1.51 | (34%) | | 1.00 | |
| 4 | Warner T18 | | | 6.32 | (51%) | | 3.09 | (45%) | | 1.69 | (41%) | | 1.00 | |
| 4 | Warner T19A | | | 4.02 | (40%) | | 2.41 | (42%) | | 1.41 | (30%) | | 1.00 | |
| 4 | Warner T19C | | | 5.11 | (41%) | | 3.03 | (41%) | | 1.79 | (44%) | | 1.00 | |
| 4 | Warner T19 | | | 6.32 | (51%) | | 3.09 | (45%) | | 1.68 | (40%) | | 1.00 | |
| 5 | ZF (Petrol) | | | 5.72 | (45%) | | 2.94 | (45%) | | 1.61 | (38%) | | 1.00 | 0.76 (24%) |
| 5 | ZF (Diesel) | | | 4.14 | (43%) | | 2.37 | (40%) | | 1.42 | (23%) | | 1.00 | 0.77 (23%) |
| 5 | Gutrag G360 | | | 5.53 | (45%) | | 3.02 | (47%) | | 1.60 | (37%) | | 1.00 | 0.77 (23%) |
| 12 | Compound | 11.49 | (42%) | 6.68 | 5.74 | (42%) | 3.34 | 2.87 | (42%) | 1.66 | 1.43 | (30%) | 1.00 | 0.86 |
| 16 | Compound | 11.49 | 7.88 | 6.68 | 5.74 | 3.94 | 3.34 | 2.87 | 1.96 | 1.66 | 1.43 | 1.18 | 1.00 | 0.86 |
| | | (32%) | (15%) | (14%) | (31%) | (15%) | (14%) | (31%) | (15%) | (13%) | (16%) | (15%) | (14%) | |

SP = Speeds;
TRANSMISSION = Particular Transmission;
DL = Deep Low;
UD = Underdrive;
D = Direct Drive;
OD = Overdrive;
(%) = percent drop in gear ratio between progressive gear shifts; ratios shown are all relative to one.

It should be noted that 2nd DL is the same as 1st direct; 3rd DL is the same as 2nd OD; and, since 4th DL is not normally used, it is not shown here.

From the table, it can be seen that the compound transmission of the invention has a definite practical advantage over prior art transmissions in the field with which the invention is concerned by filling the usual gaps between the basic four gear ratios with an extended range of gear ratios. This not only eliminates driver-frustrating "holes" between the usual gears available to a driver, but provides a considerably greater number of available gears into which a driver can shift while still being served by the narrow range of peak engine performance.

Continuing on with the description of structural features of the illustrated compound transmission of the invention, the mainshaft 29 of auxiliary transmission section 11 corresponds in general to the prior art mainshaft shown in FIG. 4 but with some modifications, the prior art tailshaft portion 30 being retained as illustrated in FIG. 2 (subject to modification for the particular vehicle concerned).

In providing additional speed ratios, i.e. additional driving gears, for the compound transmission of the invention, the series of four regular forward drives of main transmission section 10 provides corresponding regular speed ratios and reverse for the compound transmission, which regular speed ratios may be selectively combined with respective ones of the four speed ratios provided by the auxiliary transmission section 11.

Mainshaft 29 of auxiliary transmission section 11 retains much of the usual forward portion of the prior art mainshaft shown in FIG. 4. This includes the usual forward shaft end 29a, which again fits into and is supported by an antifriction bearing (not shown) that is, itself, fitted into the adjacent, recessed, rearward end of mainshaft 16 on which are the auxiliary power input drive gears, i.e. helical gear 16g and direct drive spur gear 16h. Such shaft end 29a is followed, as usual, by the usual cylindrical mounting member 29b, which provides splines that receive direct and overdrive clutch gear 31a of sliding, synchromesh, clutch mechanism 31 to provide direct drive ratio when such clutch mechanism 31 (that, as usual, is slidably mounted on clutch gear 31a) is slid, by operation of gearshift stick 32 acting through shift lever 32a, into mesh with auxiliary spur drive gear 16h while still being partly in mesh with clutch gear 31a.

Cylindrical mounting member 29b is followed on mainshaft 29 by longitudinal shaft portion 29c provided with the usual oil grooves. Rotatably mounted on shaft portion 29c is dual gear 33 having helical gear portion 33a in constant mesh with countershaft gear 28b to provide an overdrive speed ratio, i.e. an overdrive gear, for the compound transmission when slidable clutch mechanism 31 is moved from neutral position to engage spur gear portion 33b of dual gear 33.

Following the usual snap ring groove on mainshaft 29, which receives snap ring 34, are longitudinal shaft portions 29d, 29e, and 29f, whose combined lengths correspond to the combined lengths of shaft portions 16d, and 16e, as modified to provide for accommodating, on portion 29d, dual gear 35; on portion 29e, clutch gear mechanism 36 with deep low and underdrive clutch gear 36a; and, on portion 29f, another dual gear 37.

Dual gear 35 is rotatably mounted on auxiliary mainshaft portion 29d and has a forward, helical gear portion 35a in constant mesh with countershaft gear 28c to provide a deep low drive ratio, i.e. deep low gear, for the transmission when such clutch mechanism 36 (that is slidably mounted on clutch gear 36a) is slid, by operation of the gearshift stick 32 acting through lever 32b, into mesh with deep low, spur gear portion 35b while still being partly in mesh with clutch gear 36a.

When both synchromesh clutch mechanisms 31 and 36 are centered over clutch gears 31a and 36a, respectively, by action of gearshift stick 32 and shift lever 32a and 32b, auxiliary transmission section 11 is in neutral.

Dual gear 37 is rotatably mounted on auxiliary main shaft portion 29f and has a helical gear portion 37a in constant mesh with auxiliary countershaft gear 28d to provide an underdrive speed ratio, i.e. underdrive gear, for the transmission when clutch mechanism 36 is slid into mesh with underdrive spur gear portion 37b while still being partly in mesh with clutch gear 36a.

The usual knob (not shown) on gearshift stick 32 of auxiliary transmission section 11 is marked in an H pattern to show how shifting is carried out for obtaining direct drive and the additional drives provided for in the compound transmission of the invention working in conjunction with any of the customarily four forward gear drives and with reverse gear drive of the main transmission section 10 that are provided by the usual prior art transmission.

By shifting stick 32 into the marked overdrive (OD) position, any one of the four forward positions or the reverse position of gearshift stick 18 may be selected to provide four forward overdrive gears and a reverse overdrive gear additional to those provided by transmission section 10.

By shifting stick 32 into the marked deep low (DL) position, any one of the four forward positions or the reverse position of gearshift stick 18 may be selected to provide additional four forward deep low gears and a reverse deep low gear.

Similarly, by shifting stick 32 into the marked underdrive (UD) position, any one of the four forward positions or the reverse position of gearshift stick 18 may be selected to provide four forward underdrive gears and a reverse underdrive gear.

This means that the compound transmission of the invention here illustrated provides a total of sixteen forward speed ratios, or gears, and a total of four reverse speed ratios, or gears.

In order to provide proper lubrication, a seal 38, FIG. 2, is provided about the forward part of main shaft portion 16f between it and a pilot sleeve 39 fitted into opening 12b of adapter plate 12, and an oil reservoir and distribution system 40 is provided to inject lubricant forwardly of bearing 27.

It should be noted that the usual antifriction ball bearing between mainshaft 29 and tailshaft 30 of the auxiliary transmission section 11 is replaced by a rearwardly sloping, tapered roller bearing 41 and that tapered roller bearings 27 and 14 both slope forwardly to contain shaft thrust while handling radial loads that are developed during operation of the transmission.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A compound transmission adapted for lightweight automotive trucks to provide a much greater number of speed ratios than usual without sacrifice of structural strength and with ease of shifting from drive gear to drive gear and with an extended range of drive gear ratios substantially within peak range of engine performance, comprising a "simple" main transmission section having main mainshaft means with a main mainshaft, main synchromesh clutch means, and main countershaft means, said main mainshaft means, said main synchromesh clutch means, and said main countershaft means providing a desired number of basic main speed change drive gears; means for shifting said main speed change drive gears and clutch means to selected speeds; an auxiliary "simple" transmission section having auxiliary mainshaft means, with an auxiliary mainshaft, auxiliary synchromesh clutch means, and auxiliary countershaft means, said auxiliary mainshaft means, said auxiliary clutch means, and said auxiliary countershaft means providing for said compound transmission several additional, auxiliary, speed change drive gears; means for shifting said additional, auxiliary, speed change drive gears and clutch means to selected ones of the several additional speeds, the mainshafts of said main and auxiliary mainshaft means being arranged end-to-end, whereby the total number of available speed change drive gears are multiplied several times; wall means interposed between said main and auxiliary transmission sections and through which said mainshaft of said mainshaft and countershaft means of said main transmission section extends; antifriction bearing means supporting a mainshaft portion of said main mainshaft means in extension thereof through said wall means; main power input drive means having a drive shaft leading into said main transmission section, with a drive gear mounted thereon and rotatable therewith for powering said drive gears and clutch means of said main transmission section; auxiliary power drive gear means carried by the mainshaft of said main mainshaft means and extending therewith into said auxiliary transmission section for powering said auxiliary speed change drive gears and clutch means thereof, whereby there is provided a power input speed ratio between said main transmission section and said auxiliary transmission section that places said speed change drive gears added by said auxiliary transmission section within substantially the peak power range of any engine with which the compound transmission is used; and tailshaft power output means extending from the mainshaft of said auxiliary mainshaft means.

2. A compound transmission according to claim 1, wherein each of the transmission sections has its own exterior housing; and wherein the wall means is an adapter plate interposed between and fastened to the housings of said transmission sections.

3. A compound transmission according to claim 2, wherein the mainshaft of the main mainshaft means has an end portion which is larger in diameter than other portions of said mainshaft, which is journaled by the adapter plate, and which leads into the auxiliary transmission section, said mainshaft of the main mainshaft means having a thereto adjoining splined portion extending inwardly of the housing of the main transmission section and carrying a sliding gear, the splines of said splined mainshaft portion extending to that end of said mainshaft end portion which is remote from said mainshaft end portion of larger diameter, in order to accommodate installation of said sliding gear.

4. A compound transmission according to claim 3, wherein lubricating means is provided for the antifriction bearing in the adaptor plate; and sealing means is positioned to confine lubricant that is supplied by said lubricating means to the circumferential surface of the mainshaft portion of larger diameter.

5. A compound transmission according to claim 1, wherein tapered roller bearings journal the drive shaft of the main power input drive means as it enters the main transmission section and that end of the mainshaft of the auxiliary mainshaft means that is remote from the main transmission section, respectively; and wherein said roller bearings slope relative to one another to contain thrust while handling radial loads developed during operation of the transmission.

6. A compound transmission according to claim 1, wherein the power input speed ratio between the main transmission section and the auxiliary transmission section, that places the speed change drive gears added by the auxiliary transmission section within substantially the peak power range of any engine with which the transmission is used, depends upon the relative number of gear teeth on the drive gears of the auxiliary transmission section.

7. A compound transmission adapted for use in lightweight, automotive trucks, comprising two "simple" transmission sections interconnected end-to-end as a main transmission section and an auxiliary transmission section, respectively, said main transmission section having mainshaft means, a portion of which extends into said auxiliary transmission section and carries within said auxiliary transmission section power input drive gears; and speed change drive gears provided by said auxiliary transmission section so as to operate within substantially the peak power range of any engine with which the compound transmission is used.

8. A compound transmission particularly adapted for use in lightweight, automotive trucks, comprising two "simple" transmission, each having power input and power output ends and being interconnected power-output-end to power-input-end to provide a main transmission section and an auxiliary transmission section, respectively; main power input drive means leading into the power input end of said main transmission section; a main mainshaft carrying speed change drive gearing within said main transmission section and extending into and carrying auxiliary power input drive means within said auxiliary transmission section; power output means leading from the power output end of said auxiliary transmission section; main countershaft means within said main transmission section and having main countershaft speed change drive gearing arranged for speed change interaction with said speed change drive gearing within said main transmission section; an auxiliary mainshaft carrying speed change drive gearing within said auxiliary transmission section; and auxiliary countershaft means within said auxiliary transmission section and having auxiliary countershaft speed change drive gearing arranged for speed change interaction with said auxiliary mainshaft speed change gearing, said auxiliary mainshaft speed change drive gearing and said auxiliary countershaft speed change drive gearing being arranged to operate substantially within the peak power range of any engine with which the transmission is used.

9. A compound transmission according to claim 8, wherein the auxiliary speed change drive gearing added to the main speed change drive gearing by the auxiliary transmission section operates within substantially the peak power range of any engine with which the transmission is used on the basis of the relative number of power input gear teeth on power input gears making up the auxiliary power input drive means.

* * * * *